United States Patent [19]
Weinshenker et al.

[11] 3,726,983
[45] Apr. 10, 1973

[54] PHARMACEUTICAL COMPOSITIONS COMPRISING TETRAHYDROPYRAN-2'-YL PROSTAGLANDIN ETHERS

[75] Inventors: Ned M. Weinshenker, Sunnyvale, Calif.; Niels H. Andersen, Seattle, Wash.

[73] Assignee: ALZA Corporation, Palo Alto, Calif.

[22] Filed: May 14, 1971

[21] Appl. No.: 143,583

[52] U.S. Cl.............424/283, 260/468 D, 260/514 D
[51] Int. Cl. ...............................................A61k 27/00
[58] Field of Search.......................................424/283

[56] References Cited

OTHER PUBLICATIONS

Katsube et al., Agricul. Biol. Chem. Vol. 33, No. 7, pg. 1,078–1,080.
Strike et al., Tetrahedron Letters No. 50, (1970), pages 4,393–4,396.

Primary Examiner—Sam Rosen
Attorney—Paul L. Sabatine and Steven D. Goldby

[57] ABSTRACT

Novel pharmaceutical compositions comprising compounds of the formula

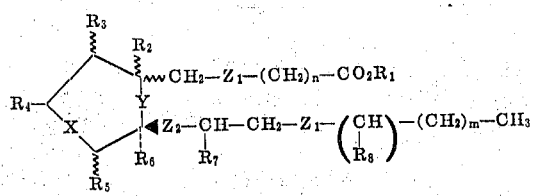

wherein $R_1$ is hydrogen or an alkyl group; $R_2$ and $R_6$ are hydrogen when $y$ is a single bond and $R_2$ and $R_6$ are absent when $y$ is a double bond; $R_3$ is keto,

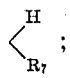

or $R_4$ is hydrogen or

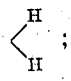

$R_5$ is hydrogen,

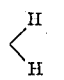

or

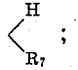

$R_7$ is

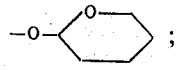

$R_8$ is hydrogen, or

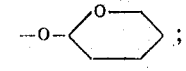

$Z_1$ is a cis or trans —CH=CH— or —$CH_2CH_2$—; $Z_2$ is trans —CH=CH— or —$CH_2CH_2$—; $x$ is a single bond or a double bond and $x$ is a double bond when $R_4$ and $R_5$ are hydrogen; $y$ is a single or a double bond; $n$ is 1 to 5; $m$ is 0 to 6; its non-toxic slats and a non-toxic carrier. The novel compositions comprising the tetrahydropyran-2'-yl prostaglandin ethers possess valuable pharmacological properties as modifiers of smooth muscle activity, gastric secretion, blood pressure, lipolysis and the reproductive system. The compositions comprising the tetrahydropyran-2'-yl prostaglandin ethers can also be used for the relief of asthma and nasal congestion and as platelet anti-clumping agents.

20 Claims, No Drawings

PHARMACEUTICAL COMPOSITIONS COMPRISING TETRAHYDROPYRAN-2'-YL PROSTAGLANDIN ETHERS

BACKGROUND OF THE INVENTION

The present invention pertains to novel and useful compositions of matter. More particularly, this invention relates to pharmaceutical compositions of matter comprising at least one tetrahydropyran-2'-yl prostaglandin ether, or its non-toxic pharmaceutically acceptable salt, singly or mixtures thereof, and a pharmaceutical carrier. The pharmaceutical compositions comprising the tetrahydropyran-2'-yl prostaglandin ethers are therapeutically indicated for making available upon hydrolysis of the tetrahydro-pyran-2'-yl prostaglandin ether controlled quantities of the parent prostaglandins. The parent prostaglandins are known to be useful as modifiers of smooth muscle activity, gastric secretion, blood pressure, lipolysis and the reproductive system. The prostaglandins are also useful for inducing labor and menses and they can be used for the relief of asthma and nasal congestion and as platelet anticlumping agents.

The tetrahydropyran-2'-yl prostaglandin ethers comprised in pharmaceutical formulations suitable for the purpose of the present invention are generically represented by Formula II:

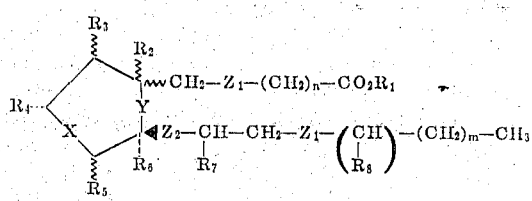

wherein $R_1$ is a member selected from the group consisting of hydrogen or an alkyl group of one to eight carbon atoms; $R_2$ and $R_6$ are both hydrogen when $y$ is a single convalent bond and $R_2$ and $R_6$ are absent when $y$ is a double convalent bond; $R_3$ is a member selected from the group consisting of keto,

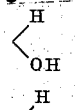

and

$R_4$ is a member selected from the group consisting of hydrogen and

$R_5$ is a member selected from the group consisting of hydrogen,

 and 

$R_7$ is

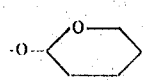

$R_8$ is a member selected from the group consisting of hydrogen and

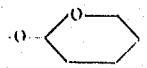

$Z_1$ is a member selected from the group consisting of a cis or trans unsaturated carbon carbon double bond — $CH=CH$— and a saturated carbon carbon bond — $CH_2CH_2$—; $Z_2$ is selected from the group consisting of a trans unsaturated carbon carbon double bond — $CH=CH$— and a saturated carbon carbon bond — $CH_2CH_2$—; $x$ is a member selected from the group consisting of a single covalent bond and a double covalent bond and $x$ is a double bond when $R_4$ and $R_5$ are both hydrogen; $y$ is selected from the group consisting of a single covalent bond and a double covalent bond; and wherein $n$ is 1 to 5 and $m$ is 0 to 6, and the pharmaceutically acceptable non-toxic salts. In Formula I and in like formulae in the specification and claims, the stereochemistry of the substituents on the 5-membered cyclopentane ring may be α-oriented or β-oriented as indicated by a wavy line. The dashed line indicates an α-orientation and the solid wedged line indicates a β-orientation. Alpha-substituents are oriented on the opposite side of the cyclopentane ring as the ω-terminal chain and β-substituents are oriented in the opposite sense or on the same side as the alkyl side chain. The substituents attached to the alkyl side chain may have a sinister (S) or rectus (R) configuration which for the projection of these compounds shown is the equivalent nomenclature of α and β respectively. The tetrahydropyran-2'-yl prostaglandins ethers depicted by Formula I includes the analogues and all the diastereomers thereof, and in addition the enantiomeric forms and such mixtures as are designated racemates. In the general formulae as illustrated herein, the substitutents at positions $R_3$, $R_4$ and the like as graphically depicted by

and the like, indicates in the formulae shown that both groups, for example, the hydrogen group and the hydroxyl group, are bonded to the carbon atom of the cyclopentane ring. The compounds used for the purpose of the invention can be named as 2'-tetrahydropyranyloxy prostaglandins, tetrahydropyran-2'-yloxy prostaglandins and tetrahydropyran-2'-yl prostaglandin ethers and for the purpose of this invention these nomenclature systems are to be construed as equivalent nomenclatures. The numbering system and stereochemistry nomenclature is disclosed in Progress In The Chemistry of Fats and Other *Lipids*, Vol IX, Part 2, pages 233 to 273, 1968, Pergamon Press, New York; and, *J. Lipids Research*, Vol 10, pages 316 to 319, 1969.

The term lower alkyl as used above and throughout the disclosure embraces the straight or branched chain alkyl hydrocarbon group containing one to eight carbon atoms inclusive such as, methyl, ethyl, n-propyl, iso-propyl, n-butyl, tert-butyl, n-pentyl, neo-pentyl, n-hexyl, iso-hexyl, n-octyl, heptyl, and the like.

The pharmaceutically acceptable, non-toxic salts of the tetrahydropyran-2'-yl prostaglandin ethers of Formula I ($R_1=H$) can also be used and they include the non-toxic alkali metal and the non-toxic alkaline earth metal basis such as sodium, potassium, calcium, lithium, copper, and magnesium,hydroxides and carbonates thereof, and the ammonium salts and substituted ammonium salts, for example, the nontoxic salts of trialkylamines such as trimethylamine, triethylamine and triisopropylamine, and other organic amines such as morpholine, diethylamine, dimethylamine, methyl cyclohexylamine, glucosamine, procaine, dibenzylamine, triethanolamine, N-benzyl-$\beta$-phenylethylamine, ethyldimethylamine, benzylamine, N-(lower)alkyl piperdines such as N-ethylpiperdine, N-methylpiperdine and other pharmaceutically acceptable amines. Also non-toxic salts with monoalkyl- and dialkylamines, and salts formed from compounds of Formula I ($R_1$=H) and tetraalkylammonium hydroxides. The latter are generally called therapeutically acceptable quaternary ammonium salts, for example, tetramethylammonium, tetrapropylammonium, tetraethylammonium, phenyltriethylammonium, benzyltri-isoprylammonium salts, and the like.

DESCRIPTION OF EMBODIMENTS

The valuable pharmacological tetrahydropyran-2'-yl prostaglandin ethers suitable for the purpose of the invention as represented by Formula I supra, are prepared from the corresponding prostaglandin (natural or synthetic) or prostaglandin intermediate by separately converting them to the appropriate prostaglandin ether compound by chemical means. The corresponding starting prostaglandin can be represented by Formula II:

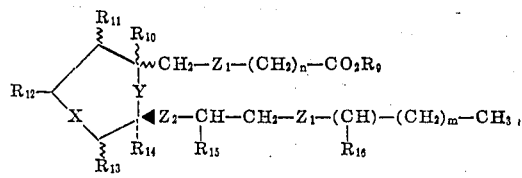

wherein $R_9$ is hydrogen, $R_{10}$ and $R_{14}$ are both hydrogen when $y$ is a single bond, and $R_{10}$ and $R_{14}$ are absent when $y$ is a double bond; $R_{11}$ is a keto group, or

$R_{12}$ is hydrogen or

$R_{13}$ is hydrogen,

or

$R_{14}$ is as defined above; $R_{15}$ is a hydroxyl group; $R_{16}$ is a hydrogen or hydroxyl group; $Z_1$ is a cis or trans unsaturated —CH=CH— group or a saturated —$CH_2CH_2$—; $Z_2$ is a trans unsaturated —CH=CH— group or a saturated —$CH_2CH_2$— group; $x$ is a carbon carbon single bond when $R_{12}$ is

and $R_{13}$ is

or

and $x$ is a carbon carbon double bond when $R_{12}$ and $R_{13}$ are hydrogen; $y$ is a carbon carbon single bond or a carbon carbon double bond as defined above; $n$ is 1 to 5 and $m$ is 0 to 6. The prostaglandin intermediate type compounds that are suitable for the present purpose are represented by Formula III:

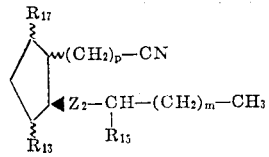

wherein $R_{17}$ is the $NHCHO$, $NHCOCH_3$, NHCO-Alkyl, or $NH_2$, $R_{13}$, $R_{15}$, $Z_2$ and $m$ are as previously defined, and $p$ is 4 to 7 and the enantiomeric forms.

The starting materials of Formula II used herein to synthesize the compounds of Formula I are prepared in art known ways or they are readily obtained from commercial sources. The starting materials of Formula II are prepared by isolating the prostaglandin from natural sources, for example, the vesicular glands of sheep, or by the enzymatic conversion from fatty acid substrates such as arachidonic acid, and depending on the substituents desired, routinely chemically transforming double bonds to single bonds by hydrogenation, converting keto groups to hydroxymethylene groups by reduction, by dehydrating to introduce double bonds, by forming carbinol derivatives by treating carbo-(lower) alkoxy groups with an alkali metal alumino hydride reducing agent such as lithium aluminum hydride and the like. Specific prior art methods that set forth the procedures useful for providing all of the natural and naturally derived starting compounds embraced by Formula II are found in *Science*, Vol 158, pages 382 to 391, 1967; *Recueil*, Vol 85, pages 1,233 to 1,250, 1966; *Biochem. Biophys. Acta.*, Vol 106, pages 215 to 217, 1965; *Agnew. Chem. Inter. Ed.*, Vol 4, pages 410 to 416, 1965; *Experientia*, Vol 21, pages 113 to 176, 1965; *Recueil*, Vol 85, pages 1,251 to 1,253, 1966; and in other art recorded procedures.

The prostaglandin compounds and the starting materials depicted by Formulas II and III can also be chemically prepared by well-known methods, for example, from a common synthetic intermediate, 11,15-bis(tetrahydropyranyl)ether of 9$\alpha$,11$\alpha$,15(S)-trihydroxy-5-cis,13-trans-prostadienoic acid, to give the resulting prostaglandins as reported in *J. Am. Chem. Soc.*, Vol 92, pages 2,586 to 2,587, 1970, and references therein; as prepared by the reduction of 2-oxa-3-oxo-6-exo-(trans-3-(S)-hydroxy-hept-1-enyl)-endo-7-acetoxy-cis-bicyclo-(3.3.0) octane followed by reduction and treatment with Wittig reagent to give the corresponding prostaglandins as set forth in *J. Am. Chem. Soc.*, Vol 91, pages 5,675 to 5,677, 1969; by the total synthesis of prostaglandins via a tricarbocyclic intermediate as reported in *Tetrahedron Letters, l* Vol 4, pages 307 to 310, 1970; by the total synthesis from 2-oxabicyclo(3·3·0)oct-6-en-3-one, ibid, pages 310 to 311, 1970; and other reported chemical synthesis embracing prostaglandins within Formula II such as the *J. Am. Chem. Soc.*, Vol 90, pages 3,245 to 3,247, 1968; ibid, Vol 91, pages 535 to 536, 1969; ibid, Vol 92, pages 397 to 398, 1970; and in *The Proceedings of the Robert A. Welch Foundation Conference on Chemical Research*, Vol XII, pages 51 to 79, 1969. The prostaglandin starting materials embraced by Formula III are known to the art by the chemical synthetic route described in *J. Am. Chem. Soc.*, Vol 90, pages 3,245 to 3,247, 1968; and ibid, Vol 91, pages 535 to 536 (1969).

The tetrahydropyran-2'-yl group is introduced onto the prostaglandin starting materials of Formula II and III by intimately contacting and reacting the prostaglandin's free hydroxyl groups with a cyclic vinyl ether that is commercially available as 2,3-dihydropyran, also known as 2,3-dihydro-4H-pyran. The hydroxy-prostaglandins are reacted, for example, with from about 1 to about 25 or more molecular equivalents of the pyran under anhydrous conditions, in the presence of an inert organic solvent and in the presence of small amounts of acid catalysts. The reaction is carried out at temperatures of 0° to 75° C, and it is usually performed at room temperature, about 25° C, or at a slightly elevated temperature for about 30 minutes to 96 hours, to produce from the starting reactants the corresponding ethers. The above reaction is reported in the chemical literature in *J. Am. Chem. Soc.*, Vol 69, pages 2,246, 1947; and ibid, Vol 70, pages 4,187 to 4,189, 1948.

Exemplary of suitable organic solvents include halogenated solvents such as methylene chloride, chloroform and ethylene dichloride, and other solvents such as tetrahydrofuran, dioxane, diethylether, dimethylether, benzene, ether benzene mixtures, carbon tetrachloride, cyclopentane, cyclooctane, n-hexane, n-heptane and the like.

Representative of acid catalysts suitable for performing the reactions are p-toluenesulfonic acid, hydrochloric acid, anhydrous hydrobromic acid, Lewis acids such as boron trifluoride, boron trichloride etherate, boron trifluoride etherate, stannic oxychloride, phorphorous oxychloride, phosphorous pentachloride, zinc chloride and the like.

The tetrahydropyran-2'-yloxy prostaglandins ($R_1=H$) can be converted to their non-toxic, pharmaceutically acceptable salt by neutralizing the prostaglandin with an equivalent or an excess amount of the corresponding non-toxic salt forming organic or inorganic base. The salts are prepared by procedures known to the art, for example, equivalent or stoichiometric quantities of the prostaglandin and the organic base are dissolved in an inert organic solvent at room temperature or in a warmed solvent with a gentle mixing of the reacting prostaglandin and the base until all the reactants are in solution. The product or salt is obtained by chilling the resulting mixture to precipitate the powder or crystals, or the product can be isolated by the addition of a miscible diluent of low polarity, or by the use of standard evaporation techniques. The formation of inorganic pyran-prostaglandin salts is also carried out by procedures known to the art; for example, the prostaglandin is dissolved in an aqeuous solution containing stoichiometric amounts or an excess amount of a non-toxic base forming inorganic sodium, calcium and potassium salts, or the like. This reaction can be carried out in the presence of an inert organic solvent, and the product is obtained by procedures such as the evaporation of the aqueous medium, or the organic medium, by the addition of miscible solvents of low polarity, or by chilling the mixture to precipitate the product.

The lower alkyl esters of the compounds are obtained by art known procedures, such as, the treatment of the prostaglandin acid with a solution containing diazo(lower)alkanes to produce the prostaglandin ester. Esterification of the prostaglandin acid is performed by reacting the acid with the diazoalkane, for example, diazomethane, diazoethane, diazopropane, diazobutane, etc., in an inert organic solvent, for example, lower alkanols, symmetrical and unsymmetrical ethers, halogenated solvents. Examples of solvents are ethanol, methanol, diethyl ether, methylethyl ether, tetrahydrofuran, acetone, chloroform, etc., or with mixtures thereof. The esterification reaction is performed at a temperature of 0° to 75° C, usually at room temperature and atmospheric pressure, with the ester recovered by evaporation of the solvent and like chemical techniques. The esterification reaction is described in *Organic Chemistry*, by Fieser and Fieser, pages 180 to 181, 1944.

The following examples are set forth as representative methods illustrative of the spirit of the present invention. These examples are not to be construed as limiting the scope of the invention as other functionally equivalent means will be readily apparent to those skilled in the subject art.

EXAMPLE 1

Synthesis of 11,15-bis(tetrahydropyran-2'-yloxy)-5-cis, 13-trans-prostadienoic, (11,15-bis THP of $PGF_2 \alpha$). Finely powdered 5-triphenylphosphonio pentanoic acid, 530 mg (1.20 m mol) is heated to 75° C in vacuo for 1 hour and is then placed under an argon atmosphere. Dry dimethyl sulfoxide, 0.8 ml, is added to dissolve the warm solid and the resulting solution is cooled to ambient temperature. Then 1.15 ml (2.30 m mol) of 2 M sodio methylsulfinylcarbanide, in dimethyl sulfoxide is added with stirring. Crude hemi acetal, Formula IV, 210 mg (0.478 m mol)

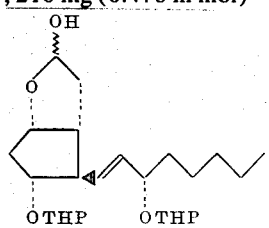

Formula IV in 0.50 ml of dry dimethylsulfoxide is added after 5 minutes. The mixture is stirred at ambient temperature for 1.0 hour, the dimethylsulfoxide is removed under reduced pressure (0.1 mm) and the residue is diluted with water. The pH of the aqueous phase is adjusted to 9–10 with solid potassium carbonate. The neutral components are extracted with ethyl acetate:ether (1:1) and then the aqueous phase is acidified with oxalic acid to pH about 3. Extraction with 1:1 pentane:ether is followed by washing the extracts with saturated brine and then drying over magnesium sulfate. Concentration yields 219 mg of the desired 11,15-bis THP of $PGF_2 \alpha$.

EXAMPLE 2

Preparation of 11,15-bis(tetrahydropyran-2'-yloxy)-9-oxo-5-cis,13-trans-prostadienoic acid, (11,15-bis THP of $PGE_2$). A mixture of the crude 11,15-bis THP of $PGF_2 \alpha$ (as prepared above), 70.0 mg (0.134 m mol) and 1.34 ml of acetone is cooled to −10° C. Then 59.0 µl (0.145 m mol) of Jones' Reagent is added over 5 minutes with stirring. After an additional 25 minutes at −10° C, isopropyl alcohol, 59 µl is added and after 5 minutes the mixture is diluted with 10 ml of ethyl acetate. The organic phase is separated, washed with water and saturated brine, dried over magnesium sulfate and concentrated to yield the colorless oily 11,15-bis THP of $PGE_2$.

EXAMPLE 3

Preparation of 11,15-bis(tetrahydropyran-2'-yloxy)-13-trans-prostenoic acid, (11,15-bis THP of $PGF_{1\alpha}$). A mixture of 39.6 mg (0.0757 m mol) of 11,15-bis THP of $PGF_{2\alpha}$ (as prepared in Preparation 1) and 9.6 mg of 5 percent Pd/C in 5.0 ml of methanol is hydrogenated at −15° C to −20° C at atmospheric pressure. After about 3 hours the mixture is filtered through Celite 545 and concentrated in vacuo to leave the desired product also containing small amounts of 13,14-dihydro-bis THP of $PGF_{1\alpha}$.

EXAMPLE 4

Preparation of 11,15-bis(tetrahydropyran-2'-yloxy)-9-oxo-13-trans-prostenoic acid, (11,15-bis THP of $PGE_1$). To a solution, cooled to −10° C, of 11,15-bis THP of $PGF_{1\alpha}$ (prepared in Preparation 3) in 1.48 ml of acetone is added 59.5 µl (0.148 m mol) of Jones' Reagent. After stirring for 5 minutes at −10° C, 59.5 µl of isopropyl alcohol is added and stirring is continued for 5 minutes at −10° C. After dilution with ethyl acetate the organic phase is washed with water and saturated brine, dried over anhydrous magnesium sulfate and concentrated to afford the colorless oily product.

EXAMPLE 5

To a solution of 500 mg of 9α,11α,15(S)-trihydroxy-13-trans-prostenoic acid, ($PGF_{1\alpha}$), and 20 ml of dioxane at 25° C there is added an excess, 1.0 ml of freshly distilled 2,3-dihydropyran and 4 mg of anhydrous p-toluenesulfonic acid catalyst, and the mixture is gently stirred for about 15 to 20 minutes. Next, the reaction mixture is quenched by adding about 5 to 6 drops of pyridine and it is diluted with about 50 ml of ether. Then, the mixture is washed with 10 ml aliquots of 50 percent brine and with 10 ml of saturated brine. Finally, the extracted organic phase is dried over $MgSO_4$ and concentrated under house vacuum to give 9α,11α,15(S)-tris(tetrahydropyran-2'-yloxy)-13-trans-prostenoic acid, (9α,11α,15(S)-tris THP of $PGF_{1\alpha}$).

EXAMPLE 6

To a solution of 500 mg of methyl 9α,11α,15(S)-trihydroxy-13-trans-prostenoate and 25 ml of anhydrous dioxane there is added 2.0 ml of freshly distilled 2,3-dihydropyran and the solution stirred to ensure a uniform mixture of the ingredients. Next, to this room temperature mixture, at about 25° C, there is added 4 mg of anhydrous p-toluene-sulfonic acid and the resulting reaction mixture is maintained at this temperature for 36 hours. Next, the reaction mixture is quenched by adding about 5 to 6 drops of pyridine and it is diluted with about 50 ml of ether. Next, the reaction mixture is washed with an aqueous 5 percent sodium carbonate solution and then with aliquots of water. Then, the mixture is dried over anhydrous sulfate and evaporated to dryness. The dry residue obtained is dissolved in n-hexane containing ethyl acetate and it is chromatographed through a column of netural silica to give methyl 9α,11α,15(S)-tris(tetrahydropyran-2'-yloxy)-13-trans-prostenoate.

EXAMPLE 7

Repeating the procedure of Example 5 but replacing 9α,11α15(S)-trihydroxy-13-trans-prostenoic acid with:
9β,11α,15(S)-trihydroxy-13-trans-prostenoic acid,
9β,11α,15(S)-trihydroxy-5-cis,13-trans-prostadienoic acid,
9α,11α,15(S)-trihydroxy-5-cis,13-trans-prostadienoic acid,
9β,11β,15(R)-trihydroxy-13-trans-prostenoic acid,
racemic 9β,11β,15(R)-trihydroxy-5-cis,13-trans-prostadienoic, and
9α,11α,15(S)-trihydroxy-5-cis,13-trans-17-cis-prostatrienoic acid, the following ethers are formed:
9β,11α,15(S)-tris(tetrahydropyran-2'-yloxy)-13-trans-prostenoic acid,
9β,11α,15(S)-tris(tetrahydropyran-2'-yloxy)-5-cis,13-trans-prostadienoic acid, and
9α,11α,15(S)-tris(tetrahydropyran-2'-yloxy)-5-cis,13-trans-prostadiemoic acid,
9β,11β,15(R)-tris(tetrahydropyran-2'-yloxy)-13-trans-prostenoic acid,
racemic 9β,11β,15(R)-tris(tetrahydropyran-2'-yloxy)-5-cis, 13-trans-prostadienoic acid, and
9α,11α,15(S)-tris(tetrahydropyran-2'-yloxy)-5-cis,13-trans, 17-cis-prostatrienoic acid.

EXAMPLE 8

To a 500 ml, 2 necked, round bottom borosilicate flask containing 0.400 g of 15(S)-hydroxy-9-oxo-10,13-trans-prostadienoic aicd ($PGA_1$), in 10 ml of 2,3-dihydropyran there is added 0.05 ml of phosphorus oxychloride. The mixture is stirred and gently heated for about 1 ¼ hours. Next, the solution is diluted with ether, washed with an aqueous sodium carbonate solution, followed by distilled water, dried over anhydrous sodium sulfate, filtered and freed of solvent under reduced pressure to give, after purification by column chromatography, the 15(S)-(tetrahydropyran-2'-yloxy)-9-oxo-10,13-trans-prostadienoic acid, (15(S)-THP of $PGA_1$).

EXAMPLE 9

Following the procedure of Example 8, but replacing 15(S)-hydroxy-910,13-trans-prostadienoic acid with:
15(S)-hydroxy-9-oxo-5-cis,10,13-trans-prostatrienoic acid,
15(R)-hydroxy-9-oxo-10,13-trans-prostadienoic acid,
15(R)-hydroxy-9-oxo-5-cis,10,13-trans-prostatrienoic acid,
15(S),19-dihydroxy-9-oxo-10,13-trans-prostadienoic acid, the following ethers are formed:
15(S)-(tetrahydropyran-2'-yloxy)-9-oxo-5-cis, 10,13-trans-prostatrienoic acid, 15(R)-(tetrahydropyran-2'-yloxy)-9-oxo-10,13-trans-prostadienoic acid, 15(R)-(tetrahydropyran-2'-yloxy)-9-oxo-5-cis, 10,13-trans-prostatrienoic acid, and, 15(S),19-bis(tetrahydropyran-2'-yloxy)-9-oxo-10,13-trans-prostadienoic acid.

EXAMPLE 10

The product 9α,11α,15(S)-tris(tetrahydropyran-2'-yloxy)-13-trans-prostenoic acid is prepared as follows: To 350 mg of 9α,11α,15(S)-trihydroxy-13-trans-prostenoic acid, ($PGF_{1\alpha}$), in 5 ml of methylene chloride there is added 1 ml of 2,3-dihydropyran and 5 mg of p-toluenesulfonic acid. Next, the reactants are heated to about 30° C and stirred at this temperature for about 30 minutes. At the end of this period, the reaction is quenched by adding 8 to 10 drops of pyridine and 50 ml of ether. Then, the mixture is washed with 50 percent brine and saturated brine and the extracted organic phase is dried over anhydrous $MgSO_4$ and concentrated in vacuo to give the desired product, which is purified by column chromatography on neutral silica using a benzene-ethyl-acetate gradient.

EXAMPLE 11

To 450 mg of 9-formamido,11α,15(S)-dihydroxy-13-trans-prostenonitrile, having the following structure, Formula V,

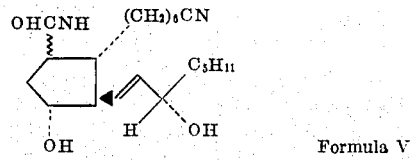

Formula V and prepared according to *J. Am. Chem. Soc.*, Vol 90, pages 3,245 to 3,248, (1968), in 5 ml of methylene chloride there is added 1.5 ml of distilled 2,3-dihydropyran and 5 mg of anhydrous p-toluenesulfonic acid and the mixture stirred for about 20 minutes at room temperature. The reaction is quenched by the addition of pyridine and ether. The product is obtained from the ether solution after drying by evaporation of the solvent in vacuo. Next, the product 9-formamido, 11α,15(S)-bis(tetrahydropyran-2'-yloxy)-13-trans-prostenonitrile, of the following structure, Formula VI:

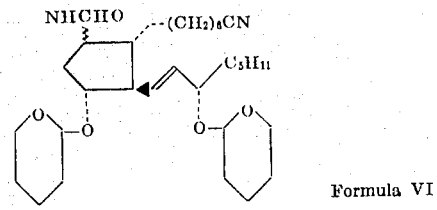

Formula VI a viscous oil, is converted to the amino acid by the hydrolysis of the cyano group and deformylation with 4 chemical equivalents of KOH in $MeOH-H_2O$ at 110°–125° C for 16 hours in a sealed tube. The amino acid product is isolated by extraction with dichloromethane after addition of water and excess solid carbon dioxide. The amino group at the 9-position is next converted to its N-bromo derivative with N-bromosuccinimide in dichloromethane; then base catalyzed dehydrobromination, using alkoxides or amidines hydrolysis in dilute aqueous acetic acid and chromatography on silica to give 11α,15(S)-bis(tetrahydropyran-2'-yloxy)-9-oxo-13-trans-prostenoic acid.

EXAMPLE 12

Following the procedure of Example 11, but replacing 9-formamido-11α,15(S)-dihydroxy-13-trans-prostenonitrile with:

racemic 9-formamido-11β,15(S)-dihydroxy-13-trans-prostenonitrile, racemic 9-formamido-11α,15(R)-dihydroxy-13-trans-prostenonitrile, racemic 9-formamido-11β,15(R)-dihydroxy-13-trans-prostenonitrile, and enantio 9-formamido-11β,15(R)-dihydroxy-13-trans-prostenonitrile, also prepared by method outlined in *J. Am. Chem. Soc.*, Vol 90, pages 3,245 to 3,248 (1968); the following ethers are formed:

racemic 11β,15(S)-bis(tetrahydropyran-2'-yloxy)-9-oxo-13-trans-prostenoic acid, racemic 11α,15(R)-bis(tetrahydropyran-2'-yloxy)-9-oxo-13-trans-prostenoic acid, racemic 11β,15(R)-bis(tetrahydropyran-2'-yloxy)-9-oxo-13-trans-prostenoic acid, and, enantio 11β,15(R)-bis(tetrahydropyran-2'-yloxy)-9-oxo-13-trans-prostenoic acid.

EXAMPLE 13

The compounds 9α-hydroxy,11α,15(S)-bis(tetrahydropyran-2'-yloxy)-13-trans-prostenoic acid and 9β-hydroxy-11α,15(S)-bis(tetrahydropyran-2'-yloxy)-13-trans-prostenoic acid are prepared by the reduction of 11α,15(S)-bis(tetrahydropyran-2'-yloxy)-9-oxo-13-trans-prostenoic acid using $NaB(R)_nH_{4-n}$ wherein R is a lower alkyl of one to four carbons in an inert organic solvent at 0° to 30° C for 15 minutes to 1 hour to give the set forth prostaglandins. For example, the reduction is carried out using sodium borohydride in methanol at 0° C for 30 minutes followed by chromatographic separation to give the respective prostaglandin ether compounds.

EXAMPLE 14 to 17

The α-homo analogues of 11,15-bis(tetrahydropyran-2'-yloxy)-5-cis,13-trans-prostadienoic acid, (11,15-bis THP of $PGF_{2\alpha}$); of 11,15-bis(tetrahydropyran-2'-yloxy-9-oxo-5-cis, 13-trans-prostadienoic acid; (11,15-bis THP of $PGE_2$); of 11,15-bis(tetrahydropyran-2'-yloxy)-13-trans-prostenoic acid, (11,15-bis THP of $PGF_1\alpha$); and of 11,15-bis(tetrahydropyran-2'-yloxy)-9-oxo-13-trans-prostenoic acid, (11,15-bis THP of $PGE_1$) are prepared according to the procedure as set forth in Example 1 to 4 inclusive, and all reaction conditions and reagents are as described except that 5-triphenylphosphonio hexanoic acid $\phi_3P^+CH_2(CH_2)_4CO_2H$ $Br^-$ ($\phi$=phenyl) is used in place of $\phi_3P^+CH_2(CH_2)_3-CO_2H$ $Br^-$ to give the desired compounds.

EXAMPLE 18

In this preparation, the 15-epimer of the lactone employed in Examples 14 to 17 inclusive, also prepared by the method set forth in *J. Am. Chem. Soc.*, Vol 92, pages 2,586 to 2,587, (1970), and the reference cited therein, and shown here as Formula VII as follows:

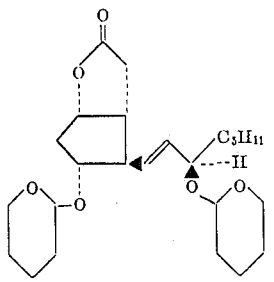

Formula VII in either this form, or as the enantiomer is reacted with $\phi_3P^+{}_2(CH_2)_3CO_2H\ Br^-$ according to the methods of Examples 14 to 17 inclusive, to produce the following ethers:

11α,15(R)-bis(tetrahydropyran-2'-yloxy)-9α-hydroxy-5-cis,13-trans-prostadienoic acid, enantio 11α,15(R)-bis(tetrahydropyran-2'-yloxy)-9α-hydroxy-5-cis,13-trans-prostadienoic acid, 11α,15(R)-bis(tetrahydropyran-2'-yloxy)-9-oxo-5-cis,13-trans-prostadienoic acid, and enantio 11α,15(R)-bis(tetrahydropyran-2'-yloxy)-9-oxo-5-cis,13-trans-prostadienoic acid.

EXAMPLE 19

Examples of additional tetrahydropyran-2'-yl prostaglandin ethers that are prepared according to the present disclosure and are suitable for the present purpose are:

11α,15(S)-bis(tetrahydropyran-2'-yloxy)-9-oxo-5-cis,13-trans-prostadienoic acid, 11α,15(S)-bis(tetrahydropyran-2'-yloxy)-9-oxo-5-cis,13-trans,17-cis-prostatrienoic acid, 11α,15(S)-bis(tetrahydropyran-2'-yloxy)-9-oxoprostanoic acid, 11α,15(S)-bis(tetrahydropyran-2'-yloxy)-9-oxo-13-trans-8-iso-prostenoic acid, 11α,15(S)-bis(tetrahydropyran-2'-yloxy)-9-oxo-13-trans-ω-homo-prostenoic acid, 15(S),19-bis(tetrahydropyran-2'-yloxy)-9-oxo-10,13-trans-prostadienoic acid, propyl 11α,15(S)-bis(tetrahydropyran-2'-yloxy)-9-oxo-5-cis,13-trans-prostadienoate, methyl 15(S)-(tetrahydropyran-2'-yloxy)-9-oxo-5-cis,10,13-trans-prostatrienoate, methyl 15(S)-(tetrahyropyran-2'-yloxy)-9-oxo-8(12),13-trans-prostadienoate, and the like.

DESCRIPTION OF PHARMACEUTICAL APPLICATIONS

The tetrahydropyran-2'-yloxy prostaglandins as included in Formula I possess valuable and useful properties. The prostaglandin ethers are inventively characterized by their ability to serve as a source of the parent prostaglandin following the metabolic hydrolysis of the prostaglandin from the tetrahydropyran-2'-yloxy moiety. For example, prostaglandin ethers as depicted by Formula I with an $R_3$ keto group and one or both of positions $R_5$ and $R_7$ substituted with a tetrahydropyran-2'-yloxy group on in vivo separation of the latter groups and with the formation of hydroxyl groups make available prostaglandins that possess many known pharmacological properties, including the ability to lower blood pressure and relieve asthma and nasal congestion. These parent prostaglandins are useful for the management of hypertension in avians, mammals, including primates, farm animals and in laboratory animals. Also, following the liberation of the tetrahydropyran groups and with concomitant formation of hydroxyl groups in vivo, these will produce for example, 11α,15(S)-dihydroxy-9-oxo-5-cis,13-trans-prostadienoic acid; the latter compound when administered at the rate of 0.5 μg/kg/min intravenously, or 2 mg/2 hrs intravaginally, or 0.5 mg/2 hrs orally, is known to be effective for the induction of labor. Representative prostaglandin ethers for obtaining prostaglandins that possess the set forth pharmacological properties include 11α,15(S)-bis(tetrahydropyran-2'-yloxy)-9-oxo-13-trans-prostenoic acid; 11α,15(S)-bis(tetrahydropyran-2'-yloxy)-9-oxo-5-cis, 13-trans-prostadienoic acid; 11α,15(S)-bis(tetrahydropyran-2'-yloxy)-9-oxo-5-cis,13-trans,17-cis-prostatrienoic acid; methyl 11α,15(S)-bis(tetrahydropyran-2'-yloxy)-9-oxo-5-cis, 13-trans,17-cis-prostatrienoate, and the like.

The prostaglandin ethers as used herein and as depicted by Formula I and substituted at the R-3, R-5 and R-7 positions with the tetrahydropyran group on liberation of the latter groups, and with concomitant in vivo formation of hydroxyl groups at the R-3, R-5 and R-7 positions, will produce prostaglandins possessing smooth muscle stimulating activity, for example, 9α,11α,15(S)-trihydroxy-13-trans-prostenoic acid; 9α,11α,15(S)-trihydroxy-5-cis,13-trans-prostadienoic acid, and the like, which latter compounds when administered intravenously (5 μg/min) or intravaginally (25 mg/2 hrs) will induce labor. Exemplary of prostaglandin ethers that furnish corresponding prostaglandins which latter prostaglandins possess smooth muscle activity are 9α,11α,15(S)-tris(tetrahydropyran-2'-yloxy)-13-trans-prostenoic acid; 9α,11α,15(S)-tris(tetrahydropyran-2'-yloxy)-5-cis,13-trans-prostadienoic acid; 9α,11α,15(S)-tris(tetrahydropyran-2'-yloxy)-5-cis,13-trans,17-cis-prostatrienoic acid; and the like.

The prostaglandin ethers of Formula I that supply in vivo a physiologically active prostaglandin characterized by a R-3 keto group and (1) a R-5 and R-7 hydroxyl group or (2) a R-3, R-5 and R-11 hydroxyl group are physiologically useful for inducing menses and for the termination of pregnancy. Representative of prostaglandin ethers that can serve as an in vivo source of physiologically active prostaglandins when administered for example intravenously at the rate of 0.1 to 1.0 μg/min. calculated as freed prostaglandins are ethers such as 9α,11α,15(S)-tris(tetrahydropyran-2'-yloxy)-13-trans-prostenoic acid; 9α,11α,15(S)-tris(tetrahydropyran-2'-yloxy)-5-cis,13-trans-prostadienoic acid; 9α,11α,15(S)-tris(tetrahydropyran-2'-yloxy)-5-cis,13-trans,17-cis-prosta-trienoic acid; 11α,15(S)-bis(tetrahydropyran-2'-yloxy)-9-oxo-5-cis,13-trans-prostadienoic acid; 11α,15(S)-bis(tetrahydro-pyran-2'-yloxy)-9-oxo-13-trans-prostenoic acid; and the like.

The prostaglandin ethers can be used for the relief of asthma, nasal congention congestion inhibition of lipolysis by supplying from prostaglandin ethers substituted with a R-3 keto and a R-7 tetrahydropyran group or a prostaglandin ether substituted with a R-3 keto and at R-5 and R-7 a tetrahydropyran group the corresponding parent prostaglandins possessing the desired therapeutic utility. Examplary of prostaglandin ethers of the invention for producing the corresponding prostaglandins include 15(S)-(tetrahydropyran-2'-yloxy)-9-oxo-10,13-trans-prostadienoic acid; 15(S)-(tetrahydropyran-2'-yloxy)-5-cis,10,13-trans-prostatrienoic acid; 11α,15(S)-bis(tetrahydropyran-2'-yloxy)-9-oxo-5-cis, 13-trans-prostadienoic acid, and the like.

The prostaglandin ethers of Formula I of the invention possess the ability to release the parent prostaglandin as need for physiological utilization. For example, the prostaglandin ethers substituted with a R-3 keto group and additionally with a R-7 or R-5 and R-7 tetrahydropyran group according to Formula I are useful for the management of gastric secretions. These prostaglandins ethers controlably release the natural anti-secretory prostaglandins in the stomach upon the acidic hydrolysis of the prostaglandin tetrahydropyran ether to free the prostaglandin group of the prostaglandin ether from the affixed tetrahydropyran ether moiety. The prostaglandin ether's ability to release free prostaglandin and thereby make controlled amounts of the parent prostaglandin available is demonstrated by using standard in vitro experiments using an acidic environment, for example, an artificial gastric juice consisting essentially of mineral acid, hydrochloric, at varying pH from 1 to 4.5 at 37° C. For example, 11α,15(S)-bis(tetrahydropyran-2'-yloxy)-9-oxo-5-cis,13-trans-prostadienoic acid, (11,15-bis THP of $PGE_2$) has a half like of 15 minutes at pH 2. Similarly, the just mentioned compound at concentration of 1 μg/ml in artificial gastric juice at pH of 2 to 2.4 releases 20 percent to 30 percent of active 11α,15(S)-dihydroxy-9-oxo-5-cis,13-trans-prostadienoic acid, $PGE_2$, in 15 minutes at 37° C. The prostaglandin ethers are unexpectedly therapeutically indicated for making available controlled amounts of prostaglandins, for example, for regulating gastric secretions, that is, hyperacidity, because as the pH of the stomach reaches 4.5 to 5 the hydrolysis of the prostaglandin ether is essentially decreased, and, as the unhydrolyzed prostaglandin ether passes from the stomach into the intestine, wherein the unwanted increased intestine peristalsis or increased intestinal motility with the accompanying bowel actions following administration of the natural form of the prostaglandins in the intestine are essentially absent for the prostaglandin ethers of the invention. In Formula I, the prostaglandin ether's ability to release prostaglandin is determined by adding small amounts, 10 micrograms, 50 micrograms, etc., of the prostaglandin ether to the acidic environment at varying pH and then detecting the presence of freed prostaglandin by conventional smooth muscle bioassay. The addition of varying concentrations of, for example, 9α,11α,15(S)-tris(tetrahydropyran-2'-yloxy)-5-cis,13-trans-prostadienoic acid, and for racemic 9α,11α,15 (S)-tris(tetrahydropyran-2'-yloxy)-5-cis,13-trans-prostadienoic acid to the mineral acid, indicated by bioassay, for example, contraction of rat uterine strips, or gerbil colon strips, that in acidic environments from about pH 1 to pH 4.5, hydrolysis of the ether linkage occurs to release the corresponding prostaglandin. The standard procedures used herein are described in *Methods of Biochemical Analysis*, Vol 17, pages 325 to 371, 1969.

The tetrahydropyran prostaglandin ether's ability to modify smooth muscle activity in vivo is shown with studies using standard laboratory rats with the prostaglandin ether administered by intragastric administration. First, the normal gastric hydrogen ion secretion of the animal is measured, followed by intravenous injection of histamine (500 μg/kg). Having established the normal hydrogen ion output in response to such a stimulus, the stimulation is then repeated while a prostaglandin ether, for example, 11α,15(S)-bis(tetrahydropyran-2'-yloxy)-9-oxo-13-trans-prostenoic acid is perfused across the gastric mucosa at the rate of 0.1 to 1 μg/min up to 10 hours and gastric perfusates are again collected through the pylorus and titrated with base, for example, sodium hydroxide, to determine the hydrogen ion output. The inhibition of gastric secretion in response to histamine or gastrin induced by the presence of prostaglandin ether can then be expressed as percent inhibition of hydrogen ion output. Utilizing this standard procedure, the parent prostaglandins evoke about a 30 to 60 percent reduction in induced gastric secretion.

The prostaglandin ethers of the invention possess desirable partition coefficients between aqueous and lipid phases and they are therefore adaptable for administering for their physiological effects from drug delivery systems, such as intrauterine contraception devices, skin drug delivery bandages and the like, manufactured from naturally occurring and synthetic polymeric materials. This novel and useful property of the prostaglandin ethers make possible their diffusion at measurable controlled rates through polymeric materials such as polyvinylchloride, polyisoprene, polybutadiene, polyethylene, ethylene-vinyl acetate copolymer, collagen, polydimethylsiloxane, hydrophilic hydrogels of esters of acrylic and methacrylic acids, polyvinyl acetates, propylene-vinyl acetate copolymers and the like.

The tetrahydropyran prostaglandin ethers can be used by the pharmaceutical and the veterinary arts in a variety of pharmaceutical preparations or veterinary preparations. In these preparations, the new compounds are administrable in the form of tablets, pills, powders, capsules, injectables, solutions, suppositories, emulsions, dispersions, food premix and in other suitable forms. The pharmaceutical or veterinary preparation which contains the compound is conveniently admixed with a non-toxic pharmaceutical organic carrier or a non-toxic pharmaceutical inorganic carrier. Typical of pharmaceutically acceptable carriers, are for example, water, gelatine, lactose, starches, magnesium stearate, talc, vegetable oils, polyalkylene glycols, petroleum jelly and other conventionally employed pharmaceutically acceptable carrier. The pharmaceutical preparation may also contain non-toxic auxiliary substances such as emulsifying, preserving, wetting agents and the like, as for example, sorbitan monolaurate, triethanolamine oleate, polyoxyethylene sorbitan monopalmityl, dioctyl sodium sulfosuccinate, and the like.

Exemplary of a typical method for preparing a tablet containing the active ingredient is to first suitably comminute the active ingredient with a diluent such as starch, sucrose, kaolin or the like to form a powder mixture. Next, the just prepared mixture can be granulated by wetting with a non-toxic binder such as a solution of gelatin, acacia mucilage, corn syrup and the like and after mixing the composition is screened to any predetermined particle sieve size. As an alternative, if preferred to granulation, the just prepared mixture can be slugged through conventional tablet machines and the slugs comminuted before the fabrication of the tablets. The freshly prepared tablets can be coated or they can be left uncoated. Representative of suitable coatings are the non-toxic coatings including shellac, methylcellulose, carnaube wax, styrenemaleic acid copolymers and the like. For oral administration, compressed tablets containing 0.01 milligram, 5 milligrams, 25 milligrams, 50 milligrams, etc., up to 1,500 milligrams are manufactured in the light of the above disclosure and by art known fabrication techniques well known to the art and set forth in *Remington's Pharmaceutical Science*, Chapter 39, Mack Publishing Co., 1965. The pharmaceutical manufacture of a formulation is shown in Example 20:

EXAMPLE 20

| | Per Tablet, Mg |
|---|---|
| Prostaglandin ether | 2.0 |
| Corn starch | 15.0 |
| Corn starch paste | 4.5 |
| Lactose | 82.0 |
| Calcium stearate | 2.0 |
| Dicalcium phosphate | 50.0 |

To formulate the tablet, uniformly blend the prostaglandin ether, corn starch, lactose, and dicalcium phosphate in a V-blender until all the ingredients are uniformly mixed together. Next, the corn starch is prepared as a 10 percent aqueous paste and it is blended with the uniform mixture until a uniform mixture is obtained. Then, the wet granulation is passed through a standard eight mesh screen, dried and rescreened with a twelve mesh screen. The dry granules are next blended with calcium stearate and compressed into tablets. Other tablets containing 0.05, 0.25, 1.0, 5.0, 10.0 mgs, etc., are prepared in a like fashion.

The manufacture of capsules for oral use consists essentially of mixing the active compound with a nontoxic carrier and enclosing the mixture in a gelatin sheath. The capsules can be in the art known soft form of a capsule made by enclosing the compound in intimate dispersion within an edible oil or the capsule can be a hard capsule consisting essentially of the novel compound mixed with a non-toxic solid such as talc, calcium stearate, calcium carbonate or the like. A typical capsule formulation is described in Example 21.

EXAMPLE 21

Capsules containing 0.1 mg, 0.5 mg, 2.5 mg, 5.0 mg, 10 mg, 20 mg, 25 mg, and the like, of prostaglandin ether, singly or mixtures of two or more prostaglandin ethers are prepared blending the following:

| | Per Capsule, mg |
|---|---|
| Prostaglandin ether | 5.0 |
| Lactose, U.S.P. | 300.0 |
| Starch | 130.0 |
| Magnesium stearate | 4.5 |

The blended ingredients are discharged into a commercially available capsule, and with the higher concentration of the prostaglandin ether as the active ingredient in the capsule, a suitable reduction is made in the amount of lactose.

Another example of the manufacture of capsules containing 0.1 milligram to 1,500 milligrams for oral use consists essentially of mixing the active compound with a nontoxic carrier and enclosing the mixture in a gelatin sheath. The capsules can be in the art known soft form of a capsule made by enclosing the compound in intimate dispersion within an edible oil or the capsule can be a hard capsule consisting essentially of the novel compound mixed with a non-toxic solid such as talc, calcium stearate, calcium carbonate or the like. Exemplary of a typical use employing capsules containing 25 mg of $11\alpha,15(S)$-bis(tetrahydropyran-2'-yloxy)-9-oxo-13-trans-prostenoic acid is therapeutically indicated ad libitum for regulating gastric secretions with lesser amounts indicated as the pH of the stomach reaches 4 to 5.

The daily dose administered for the compounds will of course vary with the particular novel prostaglandin ether employed because of the varying potency of the compounds, the chosen route of administration and the size of the recipient. The dosage administered is not subject to definite bounds, but it will usually be an effective amount or the equivalent on a molar basis of the pharmacologically active free acid form produced upon the metabolic release of the prostaglandin to achieve the biological function of the prostaglandin. Representative of a typical method for administering the tetrahydropyran ethers of prostaglandin of the invention is by the oral route. By this route, 10 $\mu$g to 75 $\mu$g per kg of recipient per day is administered to evoke the desired effects. Thus, for a typical 75 kg recipient the daily dose is about 750 $\mu$g to 4125 $\mu$g. Another typical method for administering the prostaglandin ethers is by the injectable-type administration route. By this route, a sterile solution containing the compound is administered intravenously or subcutaneously at the rate of 0.01 microgram to 0.50 microgram per kilogram of body weight per minute by means of an infusion pump at the rate of 10 to 15 milliter per hour. For example, the compound $9\alpha,11\alpha,15$-(S)-tris(tetrahydropyran-2'-yloxy)-13-trans-prostenoic acid can be administered by this route for producing stimulation of smooth muscles. The compound is administered by the injectable route in a form suited for injection, such as mixed with sterile physiological saline, or in aqueous solutions having incorporated therein an agent that delays absorption such as aluminum monostearate and the like.

Suitable topical preparations can easily be prepared by, for example, mixing 500 mg of the ether of prostaglandins with 15 g of cetyl alcohol, 1 g of sodium lauryl sulfate, 40 g of liquid silicone D.C. 200 sold by Dow Corning Co., Midland, Michigan, 43 g of sterile water, 0.25 g of methylparaben and 0.15 g of propylparaben and warming the mixture with constant stirring to about 75° C and then permitting the preparation to congeal. The preparation can be readily applied to the skin by inunction or it can be applied topically by dispensing the preparation from a conventional surgical gauze dispenser, and the like. The prostaglandin ethers penetrate the outermost layer of the skin, the stratum corneum, more readily than unetherified prostaglandins and as such the prostaglandin ethers lend themselves to topical administration. Suitable procedures for preparing topical applications are set forth in *Remington's Pharmaceutical Science*, Chapter 37, as cited supra.

The compounds of this invention can also be conveniently administered in aerosol dosage form. An aerosol form can be described as a self-contained sprayable product in which the propellant force is supplyed by a liquified gas. For administering a self-propelled dosage form, via nasal or pulmonary route, a dose of about 1 mg to 50 mg that is used about 3 or 4 times daily for inhalation therapy, the compound 15(S)-(tetrahydropyran-2'-yloxy)-9-oxo-10·13-trans-prostadienoic acid is suspended in an inert non-toxic propellant in a commercially available compressed-gas aerosol container. Suitable propellants include trichloromonofluoromethane, dichlorodifluoromethane, dichlorodifluoroethane, monochlorodifluoroethane and mixtures thereof. The inert gas can also be mixed with non-toxic cosolvents such as ethanol, if desired, to produce the aerosol form. If the compound is administered by oral inhalation employing conventional nebulizers, it is convenient to dilute in an aqueous solution about 1 part of the prostaglandin ether with about 1,000 to 10,000 parts of solution, for administering 3 or 4 times per day.

For administering to valuable domestic household, sport or farm animals, such as sheep, goats, cattle, etc., or for administering to laboratory animals such as mice, rats, guinea pigs, monkeys, etc., for scientific studies, the compound is prepared in the form of a food premix, such as mixing with dried fish meal, oatmeal, straw, hay, ground corn, mash, and the like, and then the prepared premix is added to the regular feed, thereby administering the compound to the domestic or laboratory animal in the form of feed. The prostaglandin ethers can also be administered in laboratory studies for determining the therapeutic utility of the prostaglandin ethers to mammals, including humans, avains and other valuable animals by other well known methods. For example, in laboratory studies with standard white laboratory rats, the compounds, for example, 9α,11α,15(S)-tris(tetrahydropyran-2'-yloxy)-13-trans-prostenoic acid can be administered orally by perfusion in saline at the rate of 0.1 microgram to 1.0 microgram per minute across the mucosal surface of the stomach to study muscle stimulation and inhibiting properties of the compound.

The prostaglandin ether compounds can also be administered with other agents for example, the prostaglandin ethers can be used with anticholinergics such as propantheline, diphemanil, oxphenonium, penthienate, tricyclamol, methscopolamine and the like, and also naturally occurring antisecretogogues such as enterogastrone, urogastrone, and the like.

The above examples and disclosure are set forth merely for illustrating the mode and the manner of the invention and various modifications and embodiments can be made by those skilled in the art in the light of the invention without departing from the spirit of the invention.

We claim:

1. A pharmaceutical composition of matter comprising a member selected from the group consisting of a prostaglandin ether, its therapeutically acceptable salts and the diaesteromers thereof, and wherein the prostaglandin ether has the following formula:

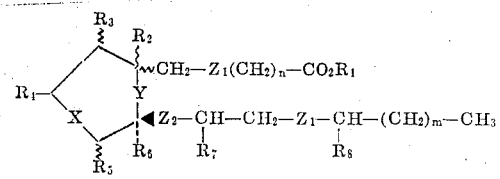

wherein $R_1$ is selected from the group consisting of hydrogen and lower alkyl of one to eight carbon atoms; $R_2$ is hydrogen when $R_6$ is hydrogen and $y$ is a single bond and $R_2$ and $R_6$ are absent when $y$ is a double bond; $R_3$ is a member selected from the group consisting of keto,

and

$R_4$ is a member selected from the group consisting of hydrogen, and

$R_5$ is a member selected from the group consisting of hydrogen,

and

$R_7$ is

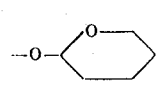

$R_8$ is a member selected from the group consisting of hydrogen, and

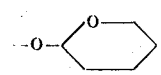

$Z_1$ is a member selected from the group consisting of cis or trans $-CH=CH-$ and $-CH_2CH_2-$; $Z_2$ is selected from the group consisting of trans $-CH=CH-$ and $-CH_2CH_2-$; $x$ is selected from the group consisting of a single bond and a double bond and $x$ is a double bond when both $R_4$ and $R_5$ are hydrogen; $y$ is selected from the group consisting of a single bond and a double bond; n is 1 to 5 and m is 0 to 6; and wherein the pharmaceutical composition comprises 0.01 micrograms to 1500 milligrams of the prostaglandin ether admixed with a pharmaceutically acceptable carrier.

2. A pharmaceutical composition according to claim 1 wherein the prostaglandin ether is 11α,15(S)-bis(tetrahydropyran-2'-yloxy)-9-oxo-13-trans-prostenoic acid.

3. A pharmaceutical composition according to claim 1 wherein the prostaglandin ether is 11α,15(S)-bis(tetrahydropyran-2'-yloxy)-9-oxo-5-cis,13-trans-prostadienoic acid.

4. A pharmaceutical composition according to claim 1 wherein the prostaglandin ether is 11α,15(S)-bis(tetrahydropyran-2'-yloxy)-9-oxo-5-cis,13-trans,17-cis-prostatrienoic acid.

5. A pharmaceutical composition according to claim 1 wherein the prostaglandin ether is 11α,15(S)-bis(tetrahydropyran-2'-yloxy)-9-oxo-13-trans-ω-homo-prostenoic acid.

6. A pharmaceutical composition according to claim 1 wherein the prostaglandin ether is 11α,15(S)-bis(tetrahydropyran-2'-yloxy)-9-oxo-13-trans-8-iso-prostenoic acid.

7. A pharmaceutical composition according to claim 1 wherein the prostaglandin ether is 11α,15(S)-bis(tetrahydropyran-2'-yloxy)-9-oxo-prostanoic acid.

8. A pharmaceutical composition according to claim 1 wherein the prostaglandin ether is 9α,11α,15(S)-tris(tetrahydropyran-2'-yloxy)-13-trans-prostenoic acid.

9. A pharmaceutical composition according to claim 1 wherein the prostaglandin ether is 9α,11α,15(S)-tris(tetrahydropyran-2'-yloxy)-5-cis,13-trans-prostadienoic acid.

10. A pharmaceutical composition according to claim 1 wherein the prostaglandin ether is 9α,11α,15(S)-tris(tetrahydropyran-2'-yloxy)-5-cis,13-trans,17-cis-prostatrienoic acid.

11. A pharmaceutical composition according to claim 1 wherein the prostaglandin ether is 15(S)-(tetrahydropyran-2'-yloxy)-9-oxo-10,13-trans-prostadienoic acid.

12. A pharmaceutical composition according to claim 1 wherein the prostaglandin ether is 15(S),19-bis(tetrahydropyran-2'-yloxy)-9-oxo-10,13-trans-prostadienoic acid.

13. A pharmaceutical composition according to claim 1 wherein the prostaglandin ether is the enantiomer of 11β,15(S)-bis(tetrahydropyran-2'-yloxy)-9-oxo-13-trans-prostenoic acid.

14. A pharmaceutical composition according to claim 1 wherein the prostaglandin ether is the enantiomer of 11α,15(R)-bis(tetrahydropyran-2'-yloxy)-9-oxo-13-trans-prostenoic acid.

15. A pharmaceutical composition according to claim 1 wherein the prostaglandin ether is the enantiomer of 11α,15(R)-bis(tetrahydropyran-2'-yloxy)-9-oxo-5-cis,13-trans-prostadienoic acid.

16. A pharmaceutical composition according to claim 1 wherein the prostaglandin ether is 11α,15(S)-bis(tetra-hydropyran-2'-yloxy)-9α-hydroxy-5-cis,13-trans-prostadienoic acid.

17. A pharmaceutical composition according to claim 1 wherein the prostaglandin ether is 9β,11α15(S)-tris(tetra-hydropyran-2'-yloxy)13-trans-prostenoic acid.

18. A pharmaceutical composition according to claim 1 wherein the prostaglandin ether is enantiomer of 9α,11β,15(R)-tris(tetrahydropyran-2'-yloxy)-13-trans-prostenoic acid.

19. A pharmaceutical composition according to claim 1 wherein the prostaglandin ether is enantio 15(S)-(tetra-hydropyran-2'-yloxy)-9-oxo,5-cis,10,13-trans-prostatrienoic acid.

20. A pharmaceutical composition according to claim 1 wherein the prostaglanin ether is enantio 15(R)-(tetra-hydropyran-2'-yloxy)-9-oxo,5-cis,10,13-trans-prostatrienoic acid.

* * * * *